United States Patent
Kalluri et al.

(10) Patent No.: US 7,881,391 B2
(45) Date of Patent: Feb. 1, 2011

(54) OFDM RECEIVER AND METHOD FOR DECODING OFDM SYMBOLS OF TWO OR MORE DATA STREAMS WITH REDUCED MULTIPLICATION OPERATIONS

(75) Inventors: Sudhakar Kalluri, Folsom, CA (US); Xiao-Feng Qi, Westfield, NJ (US); Keith A. Holt, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 978 days.

(21) Appl. No.: 11/615,722

(22) Filed: Dec. 22, 2006

(65) Prior Publication Data

US 2008/0152027 A1     Jun. 26, 2008

(51) Int. Cl.
H04K 1/10 (2006.01)
H04L 27/28 (2006.01)
H03K 9/00 (2006.01)
H04L 27/00 (2006.01)

(52) U.S. Cl. .................. 375/260; 375/144; 375/316; 375/341; 375/346

(58) Field of Classification Search ............ 370/208, 370/334; 375/260, 341, 144, 316, 346; 382/218; 714/756

See application file for complete search history.

(56) References Cited

U.S. PATENT DOCUMENTS

| | | | |
|---|---|---|---|
| 2002/0048333 A1* | 4/2002 | Ahmed et al. | 375/346 |
| 2004/0161066 A1* | 8/2004 | Hwang et al. | 375/350 |
| 2004/0171366 A1* | 9/2004 | Bar-Ness et al. | 455/278.1 |
| 2004/0181419 A1* | 9/2004 | Davis et al. | 705/1 |
| 2004/0258025 A1* | 12/2004 | Li et al. | 370/334 |
| 2005/0018755 A1* | 1/2005 | Chae et al. | 375/144 |
| 2005/0047524 A1* | 3/2005 | Chiu et al. | 375/316 |
| 2007/0223365 A1* | 9/2007 | Tsfaty et al. | 370/208 |
| 2007/0230631 A1* | 10/2007 | Lomnitz et al. | 375/341 |
| 2007/0286497 A1* | 12/2007 | Podilchuk | 382/218 |
| 2007/0297521 A1* | 12/2007 | Guo et al. | 375/260 |
| 2009/0164866 A1* | 6/2009 | Nakamura et al. | 714/756 |

OTHER PUBLICATIONS

Lomnitz, Y., et al., "System, Method and Device of Decoding Spatially Multiplexed Signals", U.S. Appl. No. 11/392,931, filed Mar. 30, 2006.

* cited by examiner

*Primary Examiner*—David C Payne
*Assistant Examiner*—Erin M File
(74) *Attorney, Agent, or Firm*—Schwegman, Lundberg & Woessner, P.A.; Gregory J. Gorrie

(57) ABSTRACT

Embodiments of an OFDM receiver and methods for decoding OFDM symbols of two or more data streams with reduced multiplication operations are generally described herein. Other embodiments may be described and claimed. In some embodiments, one or more terms of a modified $L_2$-squared-norm cost function are precomputed and stored for predetermined complex symbol values of one or more tones of OFDM symbols prior to performing a searching process. During the searching process, the cost function is computed using the precomputed terms and received data symbols using shifting and adding operations, rather than multiplication operations. In other embodiments, non-$L_2$-squared-norm cost functions are used.

18 Claims, 2 Drawing Sheets

OFDM RECEIVER AND METHOD FOR DECODING OFDM SYMBOLS OF TWO OR MORE DATA STREAMS WITH REDUCED MULTIPLICATION OPERATIONS

TECHNICAL FIELD

Embodiments of the present invention pertain to wireless communications. Some embodiments relate to multiple-input multiple-output (MIMO) orthogonal frequency division multiplexed (OFDM) communications. Some embodiments relate to maximum-likelihood (ML) demapping.

BACKGROUND

Many receivers, including OFDM receivers, utilize ML demapping to extract the transmitted symbols from received signals by performing a search process. In MIMO systems in which two or more data streams are concurrently transmitted by two or more transmit antennas, ML demapping becomes very processing intensive, conventionally requiring a very large number of multiplications. In the case of 64-QAM (quadrature amplitude modulation), the ML demapping operations conventionally require $64^T$-point searches for each OFDM tone, wherein T is the number of transmitted information streams. In the case of two streams, a 4096 point search would be required. This very large number of multiplication operations increases the complexity, cost, and power consumption of OFDM receivers.

Thus, there are general needs for methods and OFDM receivers that can extract the transmitted symbols from two or more transmitted streams with reduced complexity, cost and/or power consumption. There are also general needs for methods and OFDM receivers that can extract the transmitted symbols from two or more transmitted streams with a reduced number of multiplication operations.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
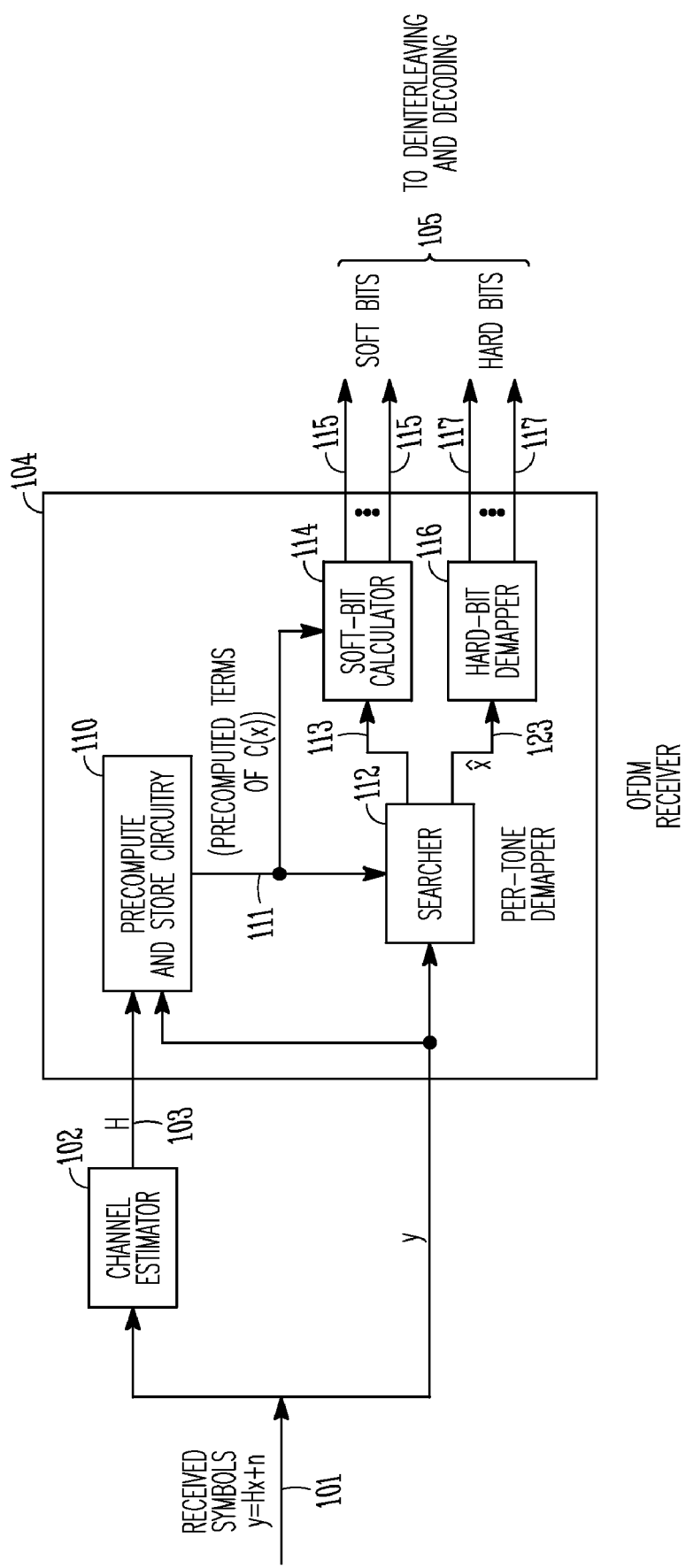
FIG. 1 is a block diagram of an OFDM receiver in accordance with some embodiments of the present invention.

FIG. 1 is a block diagram of an OFDM receiver in accordance with some embodiments of the present invention. The OFDM receiver illustrated in FIG. 1 includes channel estimator 102 to generate channel estimates 103 from received training symbols, and per-tone demapper 104 to generate demapped bits 105 from received data symbols 101. In some embodiments, channel estimates 103 may be in the form of a channel matrix H. In MIMO embodiments, channel estimator 102 and per-tone demapper 104 may be functionally provided within the OFDM receiver on a per-tone basis to generate a set of demapped bits 105 for each tone (i.e., subcarrier) of the received OFDM signals. Demapped bits 105 may generally comprise either soft bits 115 or hard bits 117. In these MIMO embodiments, in which two or more data streams are concurrently transmitted by two or more transmit antennas on the same subcarrier frequencies, demapped bits 105 may be provided for each transmit stream. In the case of T transmitted streams, either T streams of soft bits 115 or T streams of hard bits 117 may be provided by per-tone demapper 104. The number of transmit streams T may range from two streams to up to ten or more streams, although the scope of the invention is not limited in this respect. Soft bits 115 may comprise final log-likelihood ratios (LLRs), although the scope of the invention is not limited in this respect. In some embodiments, per-tone demapper 104 may provide T streams of soft bits 115 and T streams of hard bits 117, although the scope of the invention is not limited in this respect.

Per-tone demapper 104 may include precompute and store circuitry 110, searcher 112, soft-bit calculator 114 and hard-bit demapper 116. Precompute and store circuitry 110 may precompute and store various data 111 for use by searcher 112 and/or soft-bit calculator 114 as described in more detail below. In these MIMO embodiments in which two or more data streams are concurrently transmitted by two or more transmit antennas on the same subcarrier frequencies, conventional ML demapping becomes very processing intensive, conventionally requiring a large number of multiplications. In accordance with embodiments of the present invention, per-tone demapper 104 may extract the transmitted symbols (e.g., soft bits 115) from two or more transmitted streams with a reduced number of multiplication operations. This may result in an OFDM receiver with reduced complexity, cost and/or power consumption.

In some embodiments, searcher 112 may generate soft-decision search output 113 for use by soft-bit calculator 114 for generating soft bits 115. In some optional embodiments, searcher 112 may also generate hard-decision search output 123 for use by hard-bit demapper 116 in generating hard bits 117, although the scope of the invention is not limited in this respect. In accordance with some embodiments, searcher 112 may use a modified $L_2$-squared-norm calculation to generate pairs of $L_2$-squared-norms (e.g., $D^{(0)}$, $D^{(1)}$) as search output 113, as described in more detail below. In some alternate embodiments, searcher 112 may use a non-$L_2$-squared-norm calculation to generate pairs of transmit symbol vectors (e.g., $x^{(0)}$, $x^{(1)}$) as search output 113, as described in more detail below. Each of these embodiments is discussed separately below. In these embodiments, most or all multiplication operations may be eliminated.

In modified $L_2$-squared-norm embodiments, searcher 112 uses a modified $L_2$-squared-norm cost-function, along with some mathematical manipulation described below to eliminate most or all within-search-loop multiplications without loss of optimality. In these embodiments, the pre-computation and storage of values by precompute and store circuitry 110 may be performed during training and prior to the searches within the data flow. In some embodiments, a modified $L_2$-squared-norm cost-function, such as cost function $C(x)$ described in Equation 1 (below), may be used for two or more transmitted streams.

$$C(x) \triangleq \frac{1}{2}[\|y - Hx\|_2^2 - \|y\|_2^2]$$
$$= \mathrm{Re}\{x^\dagger \cdot \tilde{B} \cdot x\} - \mathrm{Re}\{s \cdot x\}$$
$$= \mathrm{Re}\{x^\dagger \cdot (\tilde{B}_1 x_1 + \tilde{B}_2 x_2)\} - \mathrm{Re}\{s_1 \cdot x_1\} - \mathrm{Re}\{s_2 \cdot x_2\},$$

$$\left\{ \begin{array}{l} \tilde{B} = \dfrac{B}{2} = [\tilde{B}_1 \tilde{B}_2],\ B = H^\dagger H = \begin{bmatrix} \gamma_1 & \gamma_3 \\ \gamma_3^+ & \gamma_2 \end{bmatrix}, \\ s = y^\dagger H = [s_1 s_2] = [(y^\dagger h_1)(y^\dagger h_2)] \\ x = \begin{bmatrix} x_1 \\ x_2 \end{bmatrix} = \begin{bmatrix} (J_{1y} + jJ_{1i}) \\ (J_{2y} + jJ_{2i}) \end{bmatrix}, \end{array} \right.$$
"$J$" $\in \{\pm 1, \pm 3, \pm 5, \pm 7\}$ An alternate expression for modified cost function C(x) may be described by Equation 2 (below):

$$C(x) = \gamma_1\left(\frac{|x_1|^2}{2}\right) + \gamma_2\left(\frac{|x_2|^2}{2}\right) + \mathrm{Re}\{(\gamma_3 x_1^+) \cdot x_2\} - \mathrm{Re}\{s \cdot x\}$$
$$= \gamma_1\left(\frac{|x_1|^2}{2}\right) + \gamma_2\left(\frac{|x_2|^2}{2}\right) + \mathrm{Re}\{(\gamma_3 x_1^+ - s_2) \cdot x_2\} - \mathrm{Re}\{s_1 \cdot x_1\}$$
$$= \gamma_1\left(\frac{|x_1|^2}{2}\right) + \gamma_2\left(\frac{|x_2|^2}{2}\right) + \mathrm{Re}\{\gamma_4(x_1) \cdot x_2\} - \mathrm{Re}\{s_1 \cdot x_1\},$$

$$\left\{ \begin{array}{l} x = \begin{bmatrix} x_1 \\ x_2 \end{bmatrix} = \begin{bmatrix} (J_{1r} + jJ_{1i}) \\ (J_{2r} + jJ_{2i}) \end{bmatrix},\ "J" \in \{\pm 1, \pm 3, \pm 5, \pm 7\}, \\ \left(\dfrac{|x_1|^2}{2}\right), \left(\dfrac{|x_2|^2}{2}\right) \in \{1, 5, 9, 13, 17, 25, 29, 37, 49\} \end{array} \right.$$

In these equations, y may represent received data symbols 101, H represents the channel matrix, x represents the actual transmitted signal, B represents a channel inner product matrix, and s represents the received signal channel matrix inner product (i.e., $s=y^\dagger H$).

In accordance with these embodiments, precompute and store circuitry 110 may precompute and store one or more terms of the modified $L_2$-squared-norm cost function C(x) illustrated in Equation 2 for predetermined complex symbol values of one or more tones of OFDM symbols. After the precomputing and storing, searcher 112 may perform a search process that comprises computing the modified $L_2$-squared-norm cost function C(x) using the precomputed terms and received data symbols (y) of the two or more transmitted data streams. In some embodiments, computing the modified $L_2$-squared-norm cost function C(x) may comprise using shifting and adding operations. A searching process may be performed to generate search output 113. The searching process may also use shifting and adding operations. Soft-bit calculator 114 may generate soft bits 115 from search output 113 for each of the two or more transmitted data streams. In the case of two transmit streams, soft bit sets $m_1$ and $m_2$ may be generated. In the case of T transmit steams, soft bit sets $m_1 \ldots m_T$ may be generated. Each soft bit set m may comprise 6 soft-bits for 64-QAM, although the scope of the invention is not limited in this respect. Each soft bit may comprise an LLR for a corresponding hard bit.

In these embodiments, one or more terms of the cost function C(x) described by either Equation 1 or Equation 2 may be precomputed. These embodiments may eliminate within-search multiplications (i.e., may eliminate most or all multiplication operations that are conventionally performed during the searching process). In other words, the $L_2$-squared-norms, illustrated as $L^2_2(y, Hx)$ may be determined without performing multiplication operations during searching, or with a reduced number of multiplication operations during searching.

In some embodiments, the shifting and adding operations used in precomputing terms of the modified $L_2$-squared-norm cost function C(x), as well as used during the searching process, may be selected to eliminate most or all multiplication operations. The shifting and adding operations may comprise decomposing real and imaginary parts of constellation symbols in a candidate transmitted symbol vector into sums of powers of two. Multiplications by powers of two may be computed by the shifting operations and the sums may be computed by the adding operations. In these embodiments, candidate transmitted symbols $x_1$ and $x_2$ (for two transmit streams) may be decomposed to remain on an integer lattice (e.g., $7=8-1=2^3-2^0$) to provide sums of powers of two.

In some embodiments, precompute and store circuitry 110 may precompute and store one or more terms of the modified $L_2$-squared-norm cost function C(x) for at least some possible complex symbol values and for one or more OFDM tones. In some embodiments, precompute and store circuitry 110 may precompute and store terms of the modified $L_2$-squared-norm cost function C(x) for all possible complex symbol values and for one or more OFDM tones, although the scope of the invention is not limited in this respect. For 64-QAM, there are 64 possible complex symbol values for each tone, however, only half (i.e., 32) of the complex symbol values may need to be computed for use during the searching process because the only difference between their values is their sign (i.e., + or −). In the case of 256-QAM, there are 256 possible complex symbol values for each tone and 128 different complex symbol values may be computed.

In embodiments in which per-tone demapper generates hard bits 117, hard-decision search output 123 generated by searcher 112 may comprise an output for an ML hard-decision. In these embodiments, hard-decision search output 123 ($x_{[hat]}$) may comprise a nearest neighbor (i.e., the nearest transmit symbol vector). This may be nearest from "y" in terms of minimizing the $L_2$-squared-distance $\|y-Hx\|^2$ between "y" and "Hx" for all possible x (e.g. out of $64^2=4096$ vectors for two transmitted steams for 64-QAM). In the case of the hard-decision ML search performed by searcher 112, hard-bit demapper 116 may demap hard-decision search output 123 to directly generate hard bits 117 corresponding to two or more data streams. For example, for QPSK modulation, hard-bit demapper 116 may convert search results from the form 1+j1 to hard bits 00.

In some embodiments, the precomputing performed by precompute and store circuitry 110 may be performed after channel estimation and either during receipt of training symbols and/or during receipt of data symbols. In these embodiments, at least some of the terms of the modified $L_2$-squared-norm cost function C(x) may be precomputed for most or all OFDM tones. The searching process may include computing the modified $L_2$-squared-norm cost function C(x) for each OFDM tone. In some embodiments, the precomputed terms may be stored in tables, although the scope of the invention is not limited in this respect.

In some embodiments, precompute and store circuitry 110 may precompute and store a channel inner product matrix (B) by post-multiplying a conjugate transpose of a channel matrix ($H^\dagger$) by the channel matrix (H) (i.e., $H^\dagger H$) to generate the channel inner product matrix (B) [$B=H^\dagger H$]. The channel matrix (H) may have been previously generated by channel estimator 102 based on the training symbols from channel estimates of channels between each antenna of a transmitting station and each antenna of a receiving station. In these embodiments, the precomputed and stored terms of the cost function C(x) may comprise the result of a multiplication of the channel inner product matrix (B) with predetermined symbol values.

In these embodiments, for two transmit streams, the terms $\tilde{B}_1 \cdot x_1$ and $\tilde{B}_2 \cdot x_2$ of cost function C(x) may be precomputed and stored for all possible values of complex symbols $x_1$ and $x_2$, where $\tilde{B}=B/2=[\tilde{B}_1, \tilde{B}_2]$. For more than two transmit streams (i.e., $x_1, x_2 \ldots x_T$), the terms $\tilde{B}_1 \cdot x_1 \ldots \tilde{B}_T \cdot x_T$ may be precomputed, where T represents the number of transmit streams.

In some embodiments, the predetermined symbol values may be decomposed into sums of powers of two allowing the multiplication of the channel inner product matrix with the predetermined symbol values to be performed substantially with shifting and adding operations and eliminating most or all multiplication operations.

In some embodiments, during receipt of data symbols, some terms of cost function C(x) may be precomputed by post-multiplying a conjugate transpose of a received signal vector $(y^\dagger)$ by component vectors (e.g., columns) of the channel matrix (H). In some embodiments, the channel matrix (H) may be a channel transfer function matrix and may comprise a channel submatrix (h) for each antenna used to transmit (i.e., in the case of two transmit antennas, $H=(h_1, h_2)$). In these embodiments, multiplying a conjugate transpose of a received signal vector $(y^\dagger)$ by elements of the channel matrix may generate the precomputed terms $(y^\dagger \cdot h_1), (y^\dagger \cdot h_2)$, which may be represented by the following equation: $s=[s_1, s_2]=y^\dagger H=[(y^\dagger \cdot h_1), (y^\dagger \cdot h_2)]$. In embodiments in which more than two streams are transmitted, the channel matrix (H) may be represented by the terms $h_1, h_2, \ldots h_T$.

In some embodiments, precompute and store circuitry 110 may precompute and store elements of the channel inner product matrix (B). In two transmit stream embodiments, precompute and store circuitry 110 may post-multiply a conjugate transpose of a channel matrix $(H^\dagger)$ by the channel matrix (H) (i.e., $H^\dagger H$) to generate elements (i.e., $\gamma_1, \gamma_2,$ and $\gamma_3$) of channel inner product matrix (B), in which $B=H^\dagger H$. In these embodiments, the precomputed terms of the cost function C(x) for two transmitted streams comprise a magnitude squared of the possible complex symbol values divided by two $(|x_1|^2/2), (|x_2|^2/2)$ multiplied by the first and second elements of the channel inner product matrix (e.g., $\gamma_1(|x_1|^2/2), \gamma_2(|x_2|^2/2)$), and the third element of the channel inner product matrix multiplied by the conjugate of possible complex symbol values (e.g., $\gamma_3 \cdot x_1^*$).

In these two transmit stream embodiments, the elements of the channel inner product matrix (B) may be represented by $\gamma_1, \gamma_2,$ and $\gamma_3$. For two transmit streams, the magnitude squared of the possible complex symbol values divided by two and multiplied by the first and second elements of the channel inner product matrix may be represented by the expressions $\gamma_1(|x_1|^2/2), \gamma_2(|x_2|^2/2)$. The third element of the channel inner product matrix multiplied by the conjugate of $x_1$ may be represented as $\gamma_3 \cdot x_1^*$. The channel inner product matrix will have additional terms for embodiments that use more than two transmit streams. In embodiments that use 64 QAM for two transmit streams, for possible values of transmitted complex symbols of $x_1$ and $x_2$, the terms $|x_1|^2/2$ and $|x_2|^2/2$ have nine possible values comprising either 1, 5, 9, 13, 17, 25, 29, 37 or 49, although the scope of the invention is not limited in this respect. In these embodiments, each of these nine possible values may be used to compute the first and second elements of the channel inner product matrix represented by the expressions $\gamma_1(|x_1|^2/2), \gamma_2(|x_2|^2/2)$ using shifting and adding operations.

In some embodiments, during receipt of data symbols, precompute and store circuitry 110 may precompute the magnitude squared of the possible complex symbol values divided by two multiplied by the first and second elements of the channel inner product matrix (e.g., $|x_1|^2/2$ and $|x_2|^2/2$) with shifting and adding operations. In these embodiments, precompute and store circuitry 110 may also precompute the third element of the channel inner product matrix multiplied by the conjugate (e.g., $\gamma_3 \cdot x_1^*$) for possible complex symbol values with shifting and adding operations.

In some embodiments, the terms of the received signal channel matrix inner product may also be precomputed (i.e., $s_1$ and $s_2$). Using these precomputed terms, during the data flow and prior to the search, the terms $\gamma_3 \cdot x_1^* - s_2$, and $Re\{s_1 \cdot x_1\}$ may be computed. In some embodiments, the terms $\gamma_3 \cdot x_1^* - s_2$, and $Re\{s_1 \cdot x_1\}$ may be computed on a tone-by-tone basis (i.e., for a current tone) allowing memory to be reused for the next tone, although the scope of the invention is not limited in this respect.

In some embodiments, soft-bit calculator 114 may perform final soft-bit calculations. In these embodiments, final soft-bits may be generated using constellation vectors from the minimizations in accordance with Equation 3 (below):

$$\hat{x}_{t,i}^{(0)} = \underset{x \in S_{t,i}^{(0)}}{\operatorname{argmin}} \|y - Hx\|_{non-L_2}, \hat{x}_{t,i}^{(1)} = \underset{x \in S_{t,i}^{(1)}}{\operatorname{argmin}} \|y - Hx\|_{non-L_2}$$

$$m_t^{(i)} \approx \|y - H\hat{x}_{t,i}^{(0)}\|_2^2 - \|y - H\hat{x}_{t,i}^{(1)}\|_2^2$$

$$\triangleq D_{t,i}^{(0)} - D_{t,i}^{(1)}; t = 1, 2, i = 1, \ldots, 6$$

In the embodiments where searcher 112 uses the modified $L_2$-squared-norm calculation, search output 113 may be represented by the terms $D_{t,i}^{(0)}$ and $D_{t,i}^{(1)}$ in Equation 3. For two transmit stream 64-QAM embodiments, t=1 and 2 and i=1, ... 6. Soft-bit calculator 114 may generate soft bits 115, which may be represented as $m_{t,i}=D_{t,i}^{(0)}-D_{t,i}^{(1)}$, based on Equation 3.

Search output 113 illustrated in Equation 3 may comprise sets $S_{t,i}^{(0)}$ and $S_{t,i}^{(1)}$, which may be referred to, respectively, as the "0-set" and "1-set" corresponding to the $i^{th}$ bit of the $t^{th}$ transmit stream. In modified $L_2$-squared-norm embodiments, the searcher output $D_{t,i}^{(0)}$ and $D_{t,i}^{(1)}$ may be referred to as the "$L_2$-squared-norm for nearest 0-set neighbor" (i.e., nearest from "y" in the sense of minimizing $L_2$-squared-distance $\|y-Hx\|^2$ between "y" and "Hx" for x within $S_{t,i}^{(0)}$) and the "$L_2$-squared-norm for nearest 1-set neighbor" corresponding to the $i^{th}$ bit of the $t^{th}$ transmit stream. The term "neighbor" refers to a transmit symbol vector and the term "$L_2$-squared-norm" relates to cost function C(x).

In embodiments wherein searcher 112 uses a non-$L_2$-squared-norm calculation, these calculations may be simplified in accordance with Equation 4 (below):

$$m_t^i \equiv m, \hat{x}_{t,i}^{(0)} \equiv x^{(0)}, \hat{x}_{t,i}^{(1)} \equiv x^{(1)} \text{ (simplify notation)}$$

-continued $$m \approx \|y - Hx^{(0)}\|_2^2 - \|y - Hx^{(1)}\|_2^2$$
$$\sim \text{Re}\{u_1 \cdot B \cdot u_2\} - \text{Re}\{s \cdot u_2\} \text{ (proportional to)}$$
$$= \text{Re}\{u_1 \cdot (B_1 u_{21} + B_2 u_{22})\} - \text{Re}\{s_1 \cdot u_{21}\} - \text{Re}\{s_2 \cdot u_{22}\}$$
$$= \text{Re}\{(u_1 B - s) \cdot u_2\}$$
$$= \text{Re}\{(u_{11} B_1 + u_{12} B_2 - s) \cdot u_2\},$$

$$\left\{ \begin{array}{l} B = [B_1 B_2] = H^\dagger H = \begin{bmatrix} \gamma_1 & \gamma_3 \\ \gamma_3^\dagger & \gamma_2 \end{bmatrix}, \\ s = y^\dagger H = [s_1 s_2] = [(y^\dagger h_1)(y^\dagger h_2)] \\ u_1 = \left(\frac{x^{(0)} + x^{(1)}}{2}\right)^\dagger = [u_{11} u_{12}] = [(I_{11\gamma} + jI_{11i})(I_{12\gamma} + jI_{12i})] \\ u_2 = \left(\frac{x^{(0)} - x^{(1)}}{2}\right) = \begin{bmatrix} u_{21} \\ u_{22} \end{bmatrix} = \begin{bmatrix} (I_{21y} jI_{21i}) \\ (I_{22r} + jI_{22i}) \end{bmatrix}, \end{array} \right.$$
$$\text{"}I\text{"} \in \{0, \pm 1, \pm 2, \pm 3, \ldots, \pm 7\}$$

In these non-$L_2$-squared-norm embodiments, searcher 112 may generate search output 113 which may be represented by the terms $x^{(0)}$ and $x^{(1)}$ in the Equation 4 (above). Search output 113 for non-$L_2$-squared-norm embodiments may comprise $x_{[hat]t,i}^{(0)}$ and $x_{[hat]t,i}^{(1)}$ illustrated in Equations 3 and 4, and may be referred to as the "nearest 0-set neighbor" and "nearest 1-set neighbor" for minimizing a non-$L_2$-squared-norm distance (i.e., $\|y-Hx\|_{(non-L2)}$) between "y" and "Hx" for x within $S_{t,i}^{(0)}$ and $S_{t,i}^{(1)}$. Soft-bit calculator 114 may generate soft bits 115 after the search using terms $u_1$ and $u_2$ in Equation 4.

These embodiments of the present invention may be suitable for use for many types of search processes that generate soft-bit decisions. These embodiments of the present invention are suitable for use with $L_2$-squared-norm searches, as discussed above, as well as with non-L2-norm searches. Some of these embodiments may also be suitable for use when a difference between two $L_2$-squared-norms is computed, although the scope of the invention is not limited in this respect. For example, when two $L_2$-squared-norms are compared as part of an $L_2$-squared-norm based search, the difference may be computed and compared to zero.

In some of these embodiments, the products of components of the channel inner product matrix (B) and components of scaled differences of the constellation vectors for OFDM tones may be computed using shifting and adding operations prior to performing the searching process. In these embodiments, the terms $B_1 \cdot u_{21}$ and $B_2 \cdot u_{22}$ of Equation 4 may be calculated for all possible $u_{21}$ and $u_{22}$. In these embodiments, the stored values may be used to compute the final soft bits using shifting and adding operations in accordance with Equation 4. In these embodiments, soft bit sets m may be computed as a difference between squared-Euclidean distances (e.g., $L^2_2(y, Hx)$) corresponding to the constellation vectors $x^{(0)}$ and $x^{(1)}$.

In some of these embodiments, $u_1$ may represent the average of constellation vectors $x^{(0)}$ and $x^{(1)}$, and $u_2$ may represent the difference between the constellation vectors $x^{(0)}$ and $x^{(1)}$. In some embodiments, rather than precomputing the averages and/or the differences of the constellation vectors, values proportional to the averages and/or the differences of the constellation vectors may be precomputed. In Equation 4, $u_{11}$ and $u_{12}$ are the components of vector $u_1$ for two transmit stream embodiments. In embodiments with more than two transmit streams (i.e., T streams), there are T components. In some embodiments, the terms of the received signal channel matrix inner product "s" may be precomputed during the receipt of the data symbols (i.e., $s=y^\dagger H$).

In some of these embodiments, the channel inner product matrix (B) may be precomputed during receipt of training symbols, and the products of components of the channel inner product matrix and components of scaled differences of the constellation vectors ($u_2$) may be calculated after the searching process using shifting and adding operations. In some embodiments, the received signal channel matrix inner product "s" may be computed during the receipt of the data symbols (i.e., $s=y^\dagger H$), and these products and "s" may be used by soft-bit calculator 114 to generate demapped bits 105 using shifting and adding operations, although the scope of the invention is not limited in this respect. In these embodiments, the terms $B_1 u_{21}$ and $B_2 u_{22}$ of Equation 4 may be calculated after the search using shifts and adds, and soft bits 115 may be calculated based on Equation 4 using shifting and adding operations.

In some embodiments, components of the channel inner product matrix and components of the averages of constellation vector $u_1$ may be precomputed and stored for all possible average constellation vector components (i.e., generating $u_{11} \cdot B_1$ and $u_{12} \cdot B_2$ for all possible $u_{11}$ and $u_{22}$) using shifting and adding operations. The stored products may be used to generate final soft bits using shifting and adding operations, although the scope of the invention is not limited in this respect. In these embodiments, the stored values may be used to calculate the term $(u_1 B-s)$ of Equation 4, and final soft bits may be calculated based on Equation 4 using shifting and adding operations, although the scope of the invention is not limited in this respect.

In some embodiments, the product of the averages of constellation vectors $u_1$ and the channel inner product matrix B (i.e., $u_1 B = u_{11} \cdot B_1 + u_{12} \cdot B_2$) may be calculated after the searching processing using shifting and adding operations. In these embodiments, the terms of the received signal channel matrix inner product "s" may be precomputed during the receipt of the data symbols (i.e., $s=y^\dagger H$). The calculated products may be used to generate final soft bits using shifting and adding operations. In these embodiments, the term $(u_1 B-s)$ of Equation 4 may be calculated after the search using shifts and adds, and final soft bits may be calculated based on Equation 4 using shifting and adding operations, although the scope of the invention is not limited in this respect.

Although the OFDM receiver of FIG. 1 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least some of the functions described herein. In some embodiments, the functional elements of The OFDM receiver may refer to one or more processes operating on one or more processing elements. Since FIG. 1 illustrates elements of The OFDM receiver that are applicable to the present invention, those of ordinary skill in the art will appreciate that The OFDM receiver may include other functional elements that are not illustrated.

Figure 2:
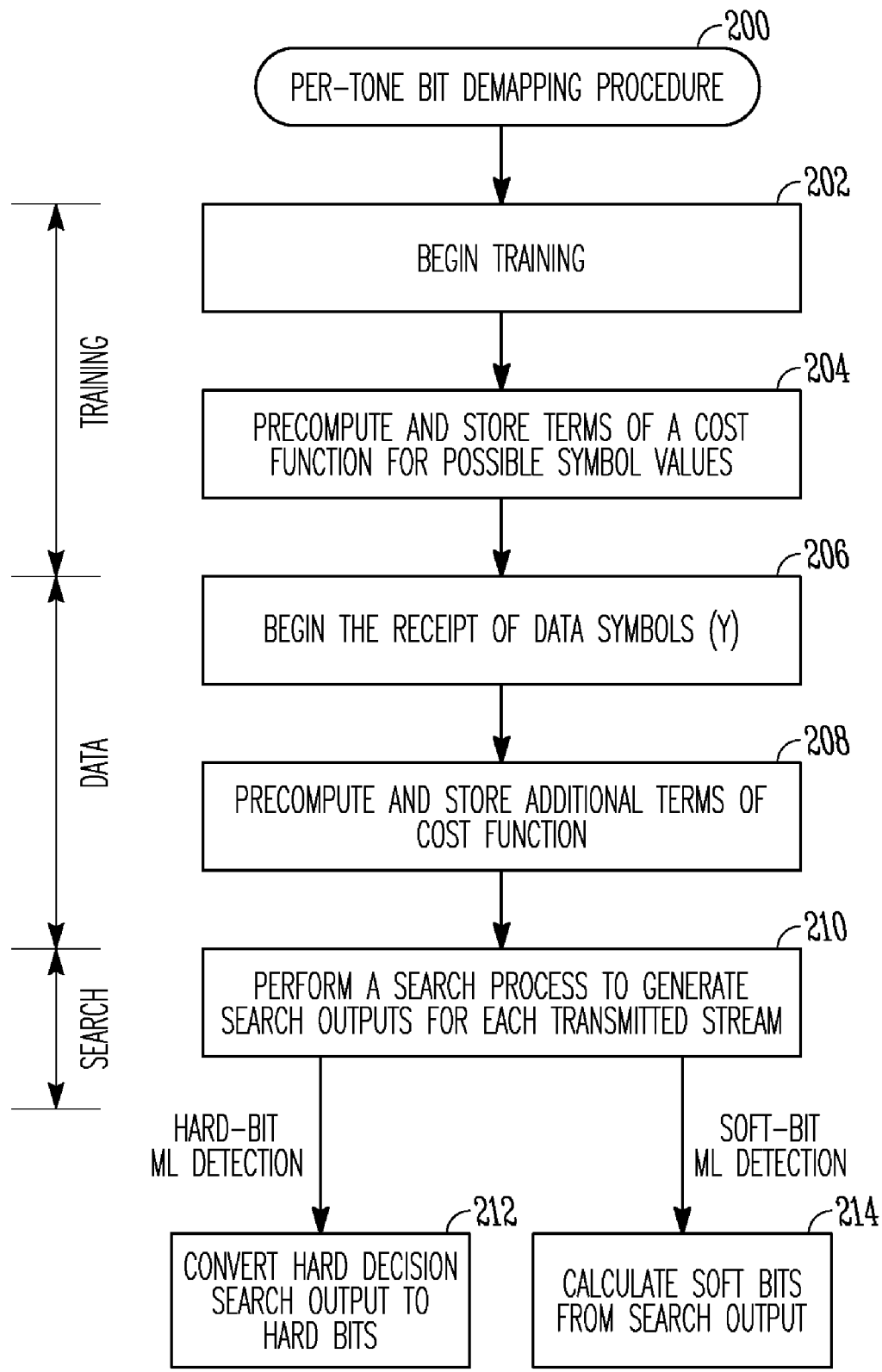
FIG. 2 is a flow chart of a per-tone bit demapping procedure in accordance with some embodiments of the present invention.

FIG. 2 is a flow chart of a per-tone bit demapping procedure in accordance with some embodiments of the present invention. Per-tone bit demapping procedure 200 may be performed by per-tone demapper 104 (FIG. 1) to generate demapped bits 105 from two or more transmit streams. Procedure 200 may generate demapped soft bits, such as soft bits 115, or generate demapped hard bits, such as hard bits 117. The performance of per-tone bit demapping procedure 200 may help eliminate most or all multiplication operations conventionally performed during the search process.

In operation 202, training begins in which training symbols are received from two or more transmit antennas. During receipt of training symbols, channel estimator 102 (FIG. 1) generates channel estimates 103, which may comprise a channel matrix (H) for a particular OFDM tone as previously discussed.

In operation 204, terms of a cost function may be precomputed and stored for possible symbol values. As illustrated, operation 204 may be performed during training. In some embodiments, operation 204 may comprise generating the channel inner product matrix (B) by precomputing and storing a conjugate transpose of a channel matrix ($H^\dagger$) post-multiplied by the channel matrix (H) (i.e., $H^\dagger H$) to generate a channel inner product matrix (B) (i.e., $B = H^\dagger H$). For two transmit streams, the terms $\tilde{B}_1 \cdot x_1$ and $\tilde{B}_2 \cdot x_2$ of cost function C(x) may be precomputed and stored for all possible values of complex symbols $x_1$ and $x_2$.

In some embodiments, for two transmit streams, the elements of the channel inner product matrix (B) may be represented by elements $\gamma_1$, $\gamma_2$, and $\gamma_3$. The channel inner product matrix (B) may have additional terms for embodiments that use more than two transmit streams. In these embodiments, operation 204 may also comprise precomputing and storing the magnitude squared of the possible complex symbol values divided by two and multiplied by the first and second elements of the channel inner product matrix (i.e., $\gamma_1(|x_1|^2/2)$, $\gamma_2(|x_2|^2/2)$). In these embodiments, operation 204 may also comprise precomputing and storing the third element of the channel inner product matrix multiplied by the conjugate of $x_1$ (i.e., $\gamma_3 \cdot x_1^*$). These multiplication operations may be performed by shifting and adding operations as previously discussed, although the scope of the invention is not limited in this respect. In some embodiments, operation 204 may comprise precomputing and storing other terms of Equation 4 as discussed above.

Operation 206 comprises beginning the receipt of data symbols (y). In some embodiments, operation 206 may begin during the performance of operation 204, although the scope of the invention is not limited in this respect.

Operation 208 comprises precomputing and storing additional terms of cost function C(x). In these embodiments, operation 208 comprises post-multiplying a conjugate transpose of a received signal vector ($y^\dagger$) by elements of the channel matrix to generate the precomputed terms ($y^\dagger \cdot h_1$), ($y^\dagger \cdot h_2$), which may be represented by the following equation: $s=[s_1, s_2]=y^\dagger H=[(y^\dagger \cdot h_1), (y^\dagger \cdot h_2)]$. In embodiments in which more than two streams are transmitted, the channel matrix may be represented by submatrices $h_1, h_2, \ldots h_T$. In some embodiments, operation 208 may comprise precomputing additional terms of Equation 4, such as the terms $\gamma_3 \cdot x_1^* - s_2$, and $\text{Re}\{s_1 \cdot x_1\}$ during the data flow and prior to the search, although the scope of the invention is not limited in this respect.

Operation 210 comprises performing a search process to generate search output 113 (FIG. 1) for each transmitted stream. In embodiments that perform hard-decision ML detection, operation 210 may comprise computing cost function C(x) based on precomputed terms using shifting and adding operations to generate an estimated symbol vector for hard-decision search output 123 (FIG. 1) by minimizing C(x).

For hard-bit ML detection, operation 212 may be performed by hard-bit demapper 116 (FIG. 1) to convert hard-decision search output 123 (FIG. 1) to hard bits 117 (FIG. 1) for each transmitted stream.

For modified $L_2$-squared-norm embodiments, in embodiments that perform soft-bit demapping, operation 210 may comprise computing cost function C(x) based on precomputed terms using shifting and adding operations to generate distances (i.e., $D_{t,i}^{(0)}$ and $D_{t,i}^{(1)}$) as search output 113 (FIG. 1) for use by soft-bit calculator 114 to calculate soft bits 115 in accordance with Equation 3.

For non-$L_2$-squared-norm embodiments, for soft-bit demapping, operation 210 may comprise performing a non-$L_2$-squared-norm search process that generates transmit symbol vectors (i.e., $x^{(0)}$ and $x^{(1)}$) as search output 113 (FIG. 1) for use by soft-bit calculator 114 to calculate soft bits 115 in accordance with Equation 4.

For soft-bit ML detection in both modified $L_2$-squared-norm embodiments and non-$L_2$-squared-norm embodiments, operation 214 may be performed by soft-bit calculator 114 (FIG. 1) in which search output 113 (FIG. 1) is used to calculate soft bits 115 (FIG. 1) for each transmitted stream.

Although the individual operations of procedure 200 are illustrated and described as separate operations, one or more of the individual operations may be performed concurrently, and nothing requires that the operations be performed in the order illustrated. In some embodiments, either operation 212 or operation 214 may be performed.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method of decoding orthogonal frequency division multiplexed (OFDM) symbols of two or more transmitted data streams, the method comprising:

precomputing and storing one or more terms of a modified $L_2$-squared-norm cost function for predetermined complex symbol values of one or more tones of OFDM symbols prior to performing a searching process;

performing the searching process that comprises computing the modified $L_2$-squared-norm cost function using the precomputed terms and received data symbols of the two or more transmitted data streams to generate a search output, the computing using shifting and adding operations; and generating soft bits corresponding to the two or more transmitted data streams from the search output, wherein the shifting and adding operations are selected to eliminate most or all multiplication operations during the precomputing and during the searching process, and wherein the shifting and adding operations comprise decomposing real and imaginary parts of constellation symbols in a candidate transmitted symbol vector into sums of powers of two, wherein multiplications by the powers of two are computed by the shifting operations and the sums are computed by the adding operations.

2. The method of claim 1, wherein the precomputing comprises precomputing one or more terms of the modified $L_2$-squared-norm cost function for a predetermined number of possible complex symbol values and for one or more OFDM tones.

3. The method of claim 2, wherein the precomputing comprises premultiplying a conjugate transpose of a channel matrix by the channel matrix to generate elements of a channel inner product matrix, and wherein the precomputed terms of the cost function for two transmitted streams comprise a magnitude squared of the possible complex symbol values divided by two multiplied by first and second elements of the channel inner product matrix, and a third element of the channel inner product matrix multiplied by the conjugate of possible complex symbol values.

4. The method of claim 3, wherein the magnitude squared of the possible complex symbol values divided by two and the predetermined complex symbol values are decomposed into sums of powers of two, and wherein the precomputing is performed substantially with shifting and adding operations using the channel inner product matrix and the decomposed predetermined complex symbol values.

5. The method of claim 4, wherein during receipt of data symbols, the method further comprises precomputing terms of the cost function comprising post-multiplying a conjugate transpose of a received signal vector by component vectors of the channel matrix.

6. The method of claim 3, wherein the terms of the cost function are precomputed for more than two transmit streams.

7. The method of claim 1, wherein the searching process is performed as part of a maximum-likelihood based soft-bit demapping process to generate soft bits of bit streams corresponding to the two or more transmitted data streams.

8. The method of claim 7, wherein the searching process generates hard-symbol decisions yielding hard-bit streams corresponding to the two or more transmitted data streams.

9. A method of decoding orthogonal frequency division multiplexed (OFDM) symbols of two or more transmitted data streams, the method comprising:

precomputing and storing one or more terms of a modified $L_2$-squared-norm cost function for predetermined complex symbol values of one or more tones of OFDM symbols prior to performing a searching process;

performing the searching process that comprises computing the modified $L_2$-squared-norm cost function using the precomputed terms and received data symbols of the two or more transmitted data streams to generate a search output, the computing using shifting and adding operations; and generating soft bits corresponding to the two or more transmitted data streams from the search output, wherein the precomputing comprises precomputing one or more terms of the modified $L_2$-squared-norm cost function for a predetermined number of possible complex symbol values and for one or more OFDM tones, wherein the precomputing is performed after channel estimation and during receipt of training symbols and during receipt of the data symbols, wherein at least some of the terms of the modified $L_2$-squared-norm cost function are precomputed for most or all OFDM tones, and wherein performing the searching process comprises computing the modified $L_2$-squared-norm cost function for each OFDM tone.

10. A method of decoding orthogonal frequency division multiplexed (OFDM) symbols of two or more transmitted data streams, the method comprising:

precomputing and storing one or more terms of a modified $L_2$-squared-norm cost function for predetermined complex symbol values of one or more tones of OFDM symbols prior to performing a searching process;

performing the searching process that comprises computing the modified $L_2$-squared-norm cost function using the precomputed terms and received data symbols of the two or more transmitted data streams to generate a search output, the computing using shifting and adding operations; and generating soft bits corresponding to the two or more transmitted data streams from the search output, wherein the precomputing comprises:

precomputing one or more terms of the modified $L_2$-squared-norm cost function for a predetermined number of possible complex symbol values and for one or more OFDM tones, post-multiplying a conjugate transpose of a channel matrix by the channel matrix to generate a channel inner product matrix, and computing and storing a result of a multiplication of the channel inner product matrix with the predetermined complex symbol values, wherein the channel matrix is generated based on training symbols from channel estimates of channels between each of a plurality of antennas of a transmitting station and each of a plurality of antennas of a receiving station.

11. The method of claim 10, wherein the predetermined complex symbol values are decomposed into sums of powers of two, and wherein the multiplication of the channel inner product matrix with the predetermined complex symbol values is performed substantially with shifting and adding operations using the channel inner product matrix and the decomposed predetermined complex symbol values.

12. The method of claim 10, wherein during receipt of data symbols, the method further comprises precomputing terms of the cost function comprising post-multiplying a conjugate transpose of a received signal vector by component vectors of the channel matrix.

13. A method for generating soft bits in an orthogonal frequency division multiplexed receiver comprising:
precomputing a channel inner product matrix; and
precomputing and storing products of components of the channel inner product matrix and components of scaled differences of constellation vectors for OFDM tones using shifting and adding operations,
wherein the precomputing operations are performed prior to performing a searching process,
wherein the method further comprises using the precomputed products to generate final soft bits using shifting and adding operations for each of two or more transmitted streams,
wherein the shifting and adding operations are selected to eliminate most or all multiplication operations during the precomputing and during the searching process, and
wherein the shifting and adding operations comprise decomposing real and imaginary parts of constellation symbols in a candidate transmitted symbol vector into sums of powers of two, wherein multiplications by the powers of two are computed by the shifting operations and the sums are computed by the adding operations.

14. The method of claim 13, further comprising precomputing terms of the channel inner product matrix during the receipt of the data symbols.

15. A method for generating soft bits in an orthogonal frequency division multiplexed receiver comprising:
precomputing a channel inner product matrix; and
precomputing and storing products of components of the channel inner product matrix and components of scaled differences of constellation vectors for OFDM tones using shifting and adding operations,
wherein the precomputing operations are performed prior to performing a searching process,
wherein the method further comprises using the precomputed products to generate final soft bits using shifting and adding operations for each of two or more transmitted streams,
wherein the channel inner product matrix is precomputed during receipt of training symbols,
wherein the products of components of the channel inner product matrix and components of the scaled differences of constellation vectors are calculated after the searching process using shifting and adding operations, and
wherein the method further comprises using the precomputed products to generate the final soft bits using shifting and adding operations for each of two or more transmitted streams.

16. A method for generating soft bits in an orthogonal frequency division multiplexed receiver comprising:
precomputing a channel inner product matrix; and
precomputing and storing products of components of the channel inner product matrix and components of scaled differences of constellation vectors for OFDM tones using shifting and adding operations,
wherein the precomputing operations are performed prior to performing a searching process,
wherein the method further comprises using the precomputed products to generate final soft bits using shifting and adding operations for each of two or more transmitted streams,
wherein the method further comprises:
precomputing and storing products of components of the channel inner product matrix and components of averages of constellation vectors for possible constellation vectors using shifting and adding operations;
precomputing a received signal channel matrix inner product; and
using the stored products and the received signal channel matrix inner product to generate final soft bits using shifting and adding operations.

17. An orthogonal frequency division multiplexed receiver comprising:
precompute and store circuitry to precompute and store one or more terms of a cost function for predetermined complex symbol values of one or more tones of OFDM symbols prior to performing a searching process;
a searcher to perform the searching process by computing the cost function using the precomputed terms and received data symbols of two or more transmitted data streams to generate a search output, the computing using shifting and adding operations; and
a soft-bit calculator to generate soft bits for the two or more transmitted data streams from the search output,
wherein the cost function comprises a modified $L_2$-squared-norm cost function,
wherein the computing the cost function comprises using shifting and adding operations selected to eliminate most or all multiplication operations during the precomputing and during the searching process, and
wherein the shifting and adding operations comprise decomposing real and imaginary parts of constellation symbols in a candidate transmitted symbol vector into sums of powers of two, wherein multiplications by the powers of two are computed by the shifting operations and the sums are computed by the adding operations.

18. The receiver of claim 17, wherein the cost function comprises a modified $L_2$-squared-norm cost function, and
wherein the precompute and store circuitry precomputes one or more terms of the modified $L_2$-squared-norm cost function for a predetermined number of possible complex symbol values and for one or more OFDM tones.

* * * * *